United States Patent Office 3,257,231
Patented June 21, 1966

3,257,231
EMULSION BREAKING PROCESS
Paul R. McEachran, Downey, and Herbert Paul Schmitt, Plumas County, Calif., assignors to MacMillan Ring-Free Oil Co., Inc., Los Angeles, Calif., a corporation of Delaware
No Drawing. Filed Mar. 12, 1965, Ser. No. 439,426
16 Claims. (Cl. 117—105.5)

This is a continuation-in-part of our co-pending application Serial No. 189,300 of the same title, filed April 23, 1962, now abandoned.

The present invention relates generally to emulsions of asphalt in water in which the water is the continuous phase; and more especially to a method of applying such asphalt-water emulsions formed with an anionic type emulsifying agent to cause the emulsions to break and set faster than they would otherwise.

Emulsions of asphalt and water have been expanding continually in use over the past several years as the technology of manufacture improves and consequently new and more widespread uses have been developed for such emulsions. Certain primary advantages are offered by the asphalt-water emulsions in that they can be prepared cheaply and easily using water as a readily available raw material. Emulsions of this type are much less expensive to prepare and less hazardous to use than solvent solutions of asphalt and in many respects are much more satisfactory to handle and apply; yet solvents have been used for many applications of asphalt because of their quick drying characteristic.

According to the method or the type of emulsifying agent used, an asphalt-water emulsion may be classed as anionic, cationic, or non-ionic, i.e., neutral. The anionic emulsions are comparatively well known and are probably the most widely used at the present time. These have been prepared in the past by using a water soluble soap or clay as the emulsifying agent. These emulsifying agents are characterized by ionizing anionically when the long chain containing the hydrocarbon or asphalt soluble portion of the molecule is a negative component or anion. This surface active anion orients itself at each emulsified water-asphalt droplet interface so that the hydrocarbon portion is contained within the asphalt and the polar end extends into the surrounding water phase. Each asphalt droplet thus possesses a negative charge as a result of this orientation of the anions present in the emulsifying agent.

Asphalt emulsions of this anionic character present several advantages in use. They are easy to handle; they are very stable and consequently can be stored for extended periods of time without settling out; and they are free from any fire hazard both in use and storage. However, the known types of anionic emulsions do have a disadvantage in that they set by evaporation of the continuous water phase. When the continuous phase is slow to break and disappear, allowing the asphalt particles to coalesce, the emulsion is correspondingly slow to set and adhere to the surface to which it is applied, forming thereon a continuous asphalt coating. This is especially true if the evaporation of the water is retarded by the presence of moisture already on the surface, high humidity in the air, low ambient temperature, or any other condition that is relatively unfavorable to the rapid evaporation of water from the emulsion.

An example of this situation is found in a filled water-asphalt emulsion which is used as a sound deadener or undercoating for automobiles or other similar applications. If the ambient temperature is below 50° F., or if the relative humidity is exceptionally high as during stormy weather, the applied asphalt and filler material will not ordinarily cure rapidly enough to permit use of this substance on a continuously moving automobile production line.

Another example of filled asphalt emulsions is in the field of roofing materials. A coating of asphalt emulsion in water will wash off a roof if subjected to rain before it is fully set; and the known types of emulsion that set by evaporation of the water often set so slowly that a roof must be coated at least three days prior to a rainstorm in order to allow sufficient time for the emulsion to dry.

It is therefore a general object of the present invention to devise a method of applying an anionic asphalt-water emulsion in a manner to accelerate the breaking and setting of the emulsion without decreasing the stability of the emulsion when stored.

This and other objects have been achieved according to this invention by applying a water-asphalt emulsion of the anionic type to a surface to be covered and adding an accelerating agent to the emulsion at the time of application of the emulsion to such surface, the accelerating agent acting to speed up the break of the emulsion. A suitable accelerating agent for this purpose is a surface active agent of the cationic type, as provided by an acidified solution of an organic salt selected from a group of water soluble compounds prepared from an amine or a quaternary ammonium base neutralized by reaction with an acid.

The emulsion and the accelerating agent are preferably applied to the surface to be coated as a mixture; and it is preferred to atomize and spray the emulsion onto the surface and simultaneously atomize and spray the accelerating agent and mix it with the asphalt spray so that the two materials are sprayed simultaneously and mixed in the spray pattern during the act of applying them to the surface to be coated with asphalt.

The emulsions with which we are here concerned are those made with an emulsifying agent which ionizes in solution in such a manner that the surface active portion of the dissociated molecule is the anion. If the emulsion contains only the continuous water phase and the dispersed particles of asphalt, it is referred to as unfilled. However, it is a particular advantage of the present invention that filled emulsions may be used in the practice of the present inventions, such emulsions containing various mineral fillers, as for example sand, asbestos fibers, or other inert materials. Unfilled emulsions are used as primers, paints, cements, waterproof coating materials, and the like; while filled emulsions find uses as automotive sound deadeners, undercoaters, roof coatings, coatings for reservoirs and canals, pavement coatings, and so on. It will be realized that whatever the ultimate use of the particular emulsion, it is in no way limitative upon the present invention.

The mineral fillers are generally compatible from the polarity standpoint with the oil particles in an anionic emulsion. This is important since the addition of fillers of this character does not tend to break the emulsion and so does not lessen its stability and storage properties.

Mineral fillers usually have a negative charge and accordingly tend to break or render unstable a cationic emulsion; and therefore such fillers cannot be added to a cationic type emulsion very far in advance of the time of application.

The accelerating agent is selected from materials which dissociate in aqueous solution to become cationic. For example, there are a number of surface active agents which in aqueous solution ionize in such a manner that the surface active portion of the dissociated molecule is an oil-soluble cation. These surface active agents or emulsifiers ionize in solution with a positively charged hydrocarbon portion soluble in asphalt and, accordingly, they produce positively charged particles of asphalt in the dispersed phase, as opposed to the negatively charged anionic emulsions referred to above. Surface active agents of this character may be referred to as of the cationic type.

Numerous compounds meet the requirements and will act as accelerating agents with different degrees of activity. In the broadest aspect, water soluble acids alone may be used but they break the emulsion only slowly. Any organic or inorganic acid that reacts only to neutralize the emulsifying agent and is free from other or side reactions may be used. Hydrochloric or sulphuric acids are preferred, but hydrobromic and hydriodic acids are other usable inorganic acids; while acetic acid and fatty acids may be used.

Another large group of compounds is that of the water soluble amines. Included in this group are diamines since they are prepared from primary amines and contain amine groupings. Like amines they are generally strong organic bases and exhibit strong cationic activity, in some cases stronger than the primary amines.

Not all amines or diamines are water soluble to the necessary degree, and this quality can be obtained by preparing certain derivatives of amines. These derivatives may be either a salt prepared by neutralizing, with an acid, an amine, which may be either a primary, secondary, or tertiary amine or an alkylated amine forming a quaternary ammonium salt. Again any acid that does not react with the organic base except to neutralize it and produce a salt, is suitable, as are those named above. Also included in the possible amines are fatty amines that have been ethoxylated with a suitable organic or mineral acid, the reaction product having the advantage of greater solubility in water than the regular salt of the fatty amine.

The salt of the amines or diamines generally have the advantage of increased solubility in water compared with the original amines or diamines, thus widening the range of suitable compounds.

It is preferred to use an aqueous solution of an amine or a salt thereof since these compounds improve the ability of the asphalt, after the emulsion breaks, to spread over and adhere to the surface to be covered. Thus in addition to acting as an accelerating agent to speed the break of the emulsion, the amines or their salts impart antistripping characteristics to the final asphalt coating.

In general, excess acid is present in the solution of the accelerating agent in order to give a pH value to the solution which is numerically equal to about 6 or less, preferably in the range of 5 to 6, though a range of 3.5 to 6 is operative. It has been found by experience that the rate of break of the asphalt emulsion can be controlled by increasing or decreasing the pH of the solution as well as by increasing or decreasing the concentration of the accelerating agent in the solution added to the emulsion. An increase in the acidity or in the concentration of accelerating agent serves to increase the rate of break of the emulsion.

According to the present invention, the accelerating agent is placed in aqueous solution of 2–5% strength and then added to the asphalt-water emulsion substantially at the time of application, using 1 part of accelerator solution to 15–50 parts of emulsion depending upon whether emulsion is filled or unfilled, speed of break desired, and so on. When added to the emulsion, the acceleration agent acts to speed up the break of the emulsion. When the two materials come in contact with each other, the anionic asphalt emulsion starts breaking because of the antagonistic nature of the cationic accelerating agent in solution. The cationic solution possesses positive charges which neutralize the negative charges present in the asphalt emulsion because of the fact that the cation of the accelerating agent is oil soluble and it orients itself with respect to the suspended asphalt particles so that the cation extends into the asphalt particle. Mixing results in a chemical break of the anionic asphalt emulsion, without waiting for evaporation of the continuous water phase, and the asphalt particles coalesce forming a continuous layer over the surface to be coated.

It is preferred for many reasons to apply the asphalt emulsion by spraying it over the surface to be coated. A dual nozzle spray head is preferably used. The asphalt-water emulsion is sprayed under pressure through one nozzle towards the surface to be coated. Simultaneously but separately through another nozzle, the solution of the accelerating agent is atomized and mixed in spray form with the spray of emulsion. Thus the emulsion and the accelerating agent are mixed in atomized form and deposited simultaneously upon the surface to be covered.

The emulsion and the accelerating agent may mix in the spray pattern and reach the surface in droplets of the mixture resulting, or the droplets of each may mix after reaching the surface.

There are many spray heads with dual nozzles, either concentric or side-by-side, commercially available that are suitable and there is no need to describe them in detail here. Selection may be made from spray heads made by the De Vilbiss Company of Toledo, Ohio or Gray Company of Minneapolis, Minnesota.

As a variant of the process, the aqueous solution of the accelerating agent can be added to the liquid stream of emulsion just prior to entering the atomizing nozzle so that both the emulsion and the aqueous solution of the accelerating agent are sprayed simultaneously from a single spray head. With this method of mixing the two solutions, care must be exercised to clear the nozzle of all of the mixed emulsion and accelerating agent prior to shutting off the spray for any length of time.

It will also be obvious from the foregoing that another variation of the method is possible in which the emulsion and the accelerating agent are sprayed upon the surface to be coated from separate nozzles which are not as closely associated with one another as in a dual spray head. Under these circumstances the agent may be sprayed first upon the surface to be coated, followed by the emulsion so that mixture takes place on the surface being covered. In all of these procedural variations the accelerating agent is added substantially at the time of application of the emulsion to the surface to be coated.

As one specific example of the present invention using an amine, a cationic solution is prepared by reacting a desired quantity of a coconut N-alkyl trimethylene diamine of commercial grade with a stoichiometric quantity of glacial acetic acid to produce the di-acetate salt of the diamine. The amine content is about 80–83% (calculated as diamine) and 38 parts by weight of acetic acid to 100 parts by weight of the diamine produces the di-substituted salt which is water soluble. The pH is then adjusted to about 6 using an excess of acetic acid. The water content is controlled to produce a 2% solution of the acetate salt in water.

The emulsion used is produced by emulsifying an asphalt from a California crude oil with a resin soap, using the sodium compound as the emulsifying agent. Such a soap is marketed commercially by Hercules Powder Company under the trademark "Vinsol." The emulsion is produced in any suitable apparatus able to reduce the asphalt to particles chiefly about 5 microns or less in size. The emulsion is mixed to contain 60% asphalt by weight. The remainder is about 38% water and 2% emulsifier. The emulsion is unfilled.

The asphalt-water emulsion thus prepared is then sprayed under suitable pressure, about 50 p.s.i., through one nozzle of a dual spray head, while the cationic solution is simultaneously sprayed out the other nozzle. The ratio of asphalt emulsion to cationic solution is maintained at about 50:1 (volumetric) or about 2% of accelerator in the final mixture. This rate produces a medium high rate of breaking and setting of the asphalt. The emulsion and the accelerator, both being atomized in the spray head, mix in the spray pattern and set rapidly. Gravel or aggregate on a road surface may need working and compacting prior to setting so that a slower set is preferred, in which case the acidity may be reduced or the unit quantity of added accelerator may be reduced, or both.

A second specific example is as follows: Emulsion, as above, comprises 60% by weight asphalt solids, 38% water and 2% soap as emulsifier. Three parts of the emulsion are then mixed with two parts of a filler comprising wetted asbestos fibers. A mineral or slag wool may be substituted for asbestos.

The accelerating agent is a 4% aqueous solution of tallow N-alkyl trimethylene dichloride with excess hydrochloric acid to give a pH of about 5.5. The dichloride is prepared by neutralizing the desired quantity of the diamine with 36% HCl in the ratio of 63 parts acid to 100 parts of commercial grade diamine calculated at 80% active diamine. The accelerator is mixed with the emulsion by spraying the two fluids through dual nozzles, in the proportion of 1 part accelerator to about 20 parts filled emulsion. This is suitable for a sound deadener or soundproofing coating for automobiles, partition walls, etc. and sets rapidly.

A filled asphalt emulsion of this type is comparatively viscous and, if of the anionic type, would take several hours at least to set. But the same emulsion applied along with an accelerating agent as described, breaks immediately. This allows the asphalt particles to coalesce and develops almost immediately a continuous, adhesive film of asphalt. The water separates out at once and runs off. So rapid is the action that the emulsion can be applied successfully to vertical or inclined surfaces without runoff leaving bare spots.

A third specific example, using the same filled emulsion as in the example immediately above is using as the accelerating agent a tertiary amine having one fatty alkyl group derived from soybean and ethoxylated to attach two polyoxyethylene groups to the nitrogen.

One hundred parts of the ethoxylated amine are neutralized with 14 parts of 36% HCl and excess acid added to produce a pH of 5. This acidified solution is added to the emulsion at the rate of 1 part to about 15 parts of emulsion.

From the foregoing description it is evident that a wide choice of materials is available to one practicing the invention. Selection of an accelerator may be made from a very large number of suitable compounds and variations in the proportions used may be made by a person skilled in the art to adapt the process to a particular set of existing conditions. Accordingly, it is understood that the foregoing description is considered to be illustrative of, rather than limitative upon, the invention defined by the appended claims.

We claim:

1. The process of applying an asphalt-water emulsion formed with an anionic emulsifying agent to a surface to be covered therewith that includes the step of adding to the emulsion substantially at the time of application a solution of a surface active agent of the cationic type that breaks the emulsion.

2. The process of applying an emulsion as claimed in claim 1 in which the added solution is acid and has a pH value numerically less than about 6.

3. The process of applying an emulsion as claimed in claim 1 in which the added solution is an aqueous solution of an organic salt with free acid.

4. The process of applying an emulsion as claimed in claim 1 in which the cationic solution is an acidified aqueous solution of the salt of an organic compound containing an amine grouping.

5. The process of applying to a surface to be covered therewith an asphalt-water emulsion formed with an anionic emulsifying agent and carrying a mineral filler, that includes the steps of adding to the emulsion immediately prior to application to the surface a solution of a surface active agent of the cationic type in sufficient quantity to break the emulsion upon application.

6. The process of applying an asphalt-water emulsion to a surface to be covered therewith that includes the steps of spraying an anionic asphalt-water emulsion on said surface;
and simultaneously but separately atomizing and mixing with the emulsion spray a solution of a surface active agent of the cationic type that breaks the emulsion.

7. The process of applying an asphalt-water emulsion according to claim 6 in which the emulsion carries a mineral filler.

8. The process of claim 7 in which the added solution is an aqueous solution of an organic salt.

9. The process as in claim 7 in which the cationic added contains sufficient free acid to have a pH numerical value of less than about 6.

10. The process of applying an anionic asphalt-water emulsion to a surface to be covered thereby that includes the steps of adding to the emulsion a solution of a surface active agent of the cationic type that breaks the emulsion;
and immediately thereafter applying the mixture of the emulsion and the solution to the surface to be covered.

11. The process as in claim 10 in which the mixture of the emulsion and the solution is sprayed in finely divided form onto the surface to be covered.

12. The process of applying a filled anionic asphalt-water emulsion to a surface to be covered thereby that includes the steps of atomizing the emulsion and spraying the emulsion onto a surface to be covered and separately atomizing an accelerating agent containing a surface active agent of the cationic type and at substantially the same time spraying onto the same surface the accelerating agent that acts to break the emulsion.

13. The process of applying a filled asphalt-water emulsion as in claim 12 in which the emulsion and accelerating agent are mixed in atomized form prior to reaching the surface to which they are applied.

14. The process of applying an asphalt-water emulsion to a surface to be covered therewith that includes the steps of
spraying a filled anionic asphalt-water emulsion on the surface; and
separately and at substantially the same time spraying onto the same surface a solution of an organic compound that dissociates in aqueous solution to form cations that are present in sufficient quantity to neutralize and break the anionic emulsion when mixed therewith.

15. The process of applying a stable emulsion of asphalt-in-water emulsified with a surface active agent of the anionic type to a surface to be coated therewith that includes the step of adding to the emulsion at the time of application an aqueous solution of a second surface active agent of the cationic type in a quantity in excess of that required to neutralize the anionic agent and thereby break the emulsion at the time of application.

16. The process of applying a stable emulsion as in claim 15 in which the emulsion and the solution are separately and simultaneously atomized and sprayed onto the surface to be coated and are mixed while being sprayed onto the surface to be coated.

References Cited by the Examiner

UNITED STATES PATENTS

| | | | |
|---|---|---|---|
| 2,314,329 | 3/1943 | Ericson | 117—105 |
| 2,585,336 | 2/1952 | McCoy | 252—311.5 |
| 2,706,688 | 4/1955 | Sommer et al. | 106—279 |
| 2,780,554 | 2/1957 | Lerner | 117—168 |
| 2,862,830 | 12/1958 | Mertens et al. | 106—277 |
| 2,900,350 | 8/1959 | Kirkpatrick | 252—344 |
| 2,974,107 | 3/1961 | Mertens et al. | 252—311.5 |

RICHARD D. NEVIUS, *Primary Examiner.*

JOSEPH B. SPENCER, *Examiner.*

A. ROSENSTEIN, *Assistant Examiner.*